United States Patent
Gustafsson et al.

(10) Patent No.: US 9,486,815 B2
(45) Date of Patent: Nov. 8, 2016

(54) POLYQUATERNARY POLYMER AS A DEPRESSANT IN A METHOD FOR FROTH FLOTATION OF POTASH ORES

(71) Applicant: Akzo Nobel Chemicals International B.V., Amersfoort (NL)

(72) Inventors: Jan Olof Gustafsson, Kungälv (SE); Christina Josefin Lannefors, Göteborg (SE)

(73) Assignee: AKZO NOBEL CHEMICALS INTERNATIONAL B.V., Amersfoort (NL)

(*) Notice: Subject to any disclaimer, the term of this patent is extended or adjusted under 35 U.S.C. 154(b) by 0 days.

(21) Appl. No.: 14/650,774

(22) PCT Filed: Dec. 17, 2013

(86) PCT No.: PCT/EP2013/076816
§ 371 (c)(1),
(2) Date: Jun. 9, 2015

(87) PCT Pub. No.: WO2014/095797
PCT Pub. Date: Jun. 26, 2014

(65) Prior Publication Data
US 2015/0314305 A1 Nov. 5, 2015

Related U.S. Application Data

(60) Provisional application No. 61/739,850, filed on Dec. 20, 2012.

(30) Foreign Application Priority Data

Dec. 20, 2012 (EP) ..................... 12198561

(51) Int. Cl.
| B03D 1/02 | (2006.01) |
| B03D 1/016 | (2006.01) |
| C08G 73/02 | (2006.01) |
| B03D 1/008 | (2006.01) |
| B03D 1/01 | (2006.01) |

(52) U.S. Cl.
CPC ............. B03D 1/016 (2013.01); B03D 1/02 (2013.01); C08G 73/022 (2013.01); C08G 73/0226 (2013.01); B03D 1/008 (2013.01); B03D 1/01 (2013.01); B03D 2201/06 (2013.01); B03D 2203/10 (2013.01)

(58) Field of Classification Search
CPC ...................................................... B01D 1/008
See application file for complete search history.

(56) References Cited

U.S. PATENT DOCUMENTS

| 2,919,026 A * | 12/1959 | Smith ................ C01D 3/08 209/167 |
| 3,017,028 A | 1/1962 | Schoeld et al. |
| 3,452,867 A * | 7/1969 | Bishop ................ B03D 1/016 209/166 |
| 3,738,945 A | 6/1973 | Panzer et al. |
| 3,782,546 A * | 1/1974 | Kirwin ................ B03D 1/016 209/166 |
| 3,805,951 A | 4/1974 | Brogoitti et al. |
| RE28,808 E | 5/1976 | Panzer et al. |
| 8,092,686 B2 | 1/2012 | Wright et al. |
| 2006/0151360 A1 | 7/2006 | Wright et al. |
| 2006/0226051 A1 | 10/2006 | Navarrette et al. |

FOREIGN PATENT DOCUMENTS

| EP | 0053733 A1 | 6/1982 |
| RU | 2165798 C1 | 4/2001 |
| RU | 2278739 C2 | 6/2006 |
| WO | 02/12626 A1 | 2/2002 |
| WO | 2004/043865 A2 | 5/2004 |
| WO | 2008/152029 A1 | 12/2008 |

OTHER PUBLICATIONS

European Search Report for Serial No. 12198561.8, dated Jun. 5, 2013.
International Search Report and Written Opinion for Serial No. PCT/EP2013/076816, date of mailing Feb. 27, 2014.
Carlos Francisco Perucca: "Testing and Evaluation of Modifying Reagents in Potash Flotation", The University of British Columbia, Nov. 2000, XP002697481.
Titkov, "Flotation of water-soluble mineral resources", International Journal of Mineral Processing, Int. J. Miner, Process. 74 (2004), pp. 107-113.
F. M. Runggas and G.S. Shephard, "Some aspects of flocculant use in the phosphatation process", Proceedings of the South African Sugar Technolgists' Association, Jun. 1977.

* cited by examiner

Primary Examiner — Thomas M Lithgow
(74) Attorney, Agent, or Firm — Matthew D. Kellam

(57) ABSTRACT

The present invention relates to the use of a polyquaternary polymer obtainable by reacting i) a dialkylamine having the structure $R_1R_2NH$, where $R_1$ and $R_2$ independently are hydrocarbyl groups having 1-3 carbon atoms; ii) a difunctional compound selected from the group consisting of epihalohydrins, diepoxides, precursors of epihalohydrins and epoxides which under alkaline conditions are readily converted into the corresponding epoxy compounds, and mixtures thereof; and iii) optionally a polyfunctional amine selected from the group consisting of ammonia, primary amines, alkylenediamines having 2-6 carbon atoms, and polyalkylenepolyamines having the structure $H_2N-[R_3-N(R_4)]_y-R_3-NH_2$, where y is an integer from 1 to 5, $R_3$ is an alkylene radical having 2 to 6 carbon atoms, and $R_4$ is selected from the group consisting of hydrogen, a hydrocarbyl group having 1-3 carbon atoms, and an ω-aminoalkyl group having 2 to 6 carbon atoms; as a depressant in a method for froth flotation of potash ores.

19 Claims, No Drawings

US 9,486,815 B2

POLYQUATERNARY POLYMER AS A DEPRESSANT IN A METHOD FOR FROTH FLOTATION OF POTASH ORES

This application is a national stage filing under 35 U.S.C. §371 of PCT/EP2013/076816, filed Dec. 17, 2013, which claims priority to U.S. Provisional Patent Application No. 61/739,850 filed Dec. 20, 2012, and European Patent Application No. 12198561.8, filed Dec. 20, 2012, the contents of which are each incorporated herein by reference in their entireties.

TECHNICAL FIELD OF INVENTION

The present invention relates to the use of a polyquaternary polymer as a depressant in a method for froth flotation of potash ores.

Technical Background of the Invention

Sylvinite (potash) ore froth flotation is a conventional process for recovering sylvite (KCl) from ore pulps. Examples of potash ores are sylvinite, carnallite, langbeinite, and kainite, and of these sylvinite is easiest to process.

Common gangue minerals in addition to halite (NaCl) are different types of water insoluble fine-grained minerals, such as clay minerals, anhydrite, iron oxides, etc., often called slime. Broadly speaking, by slime is meant fine-grained siliceous materials such as clays and sand.

The siliceous gangue (clay) consists of very fine particles and represents a large surface area which interferes negatively with the recovery of sylvite (KCl) flotation in the sylvinite, or other potash ore, froth flotation process. The collector used during the potash flotation typically adsorbs to the clay, resulting in high collector consumption and poor metallurgical results. The clay also interferes with other sylvite beneficiation processes such as dissolution procedures.

Several technical developments have addressed the problems arising from the presence of slime, such as mechanical methods for removal, e.g. use of hydro cyclones, centrifuges and hydro separators, as well as slime flotation.

The process step for separation of the major amounts of slime will typically be followed by a flotation step of the sylvite, where the residual slime needs to be blinded for adsorption of the sylvite collector by a so-called depressant. Many different types of polymers have been used for this purpose, e.g. natural polysaccharides, such as starch from different sources (corn, potato etc), guar gum, modified natural polymers, such as carboxymethylcellulose (CMC) and lignino-sulphonates, and synthetic polymers such as formaldehyde-urea resins.

RU 2165798 relates to a method for treatment of sylvite flotation feed with a depressant that is a modified urea-formaldehyde resin containing polyethyleneimine.

U.S. Pat. No. 8,092,686 relates to modified resins for use in separation processes, for example as depressants in froth flotation, which resins comprise a base resin that is the reaction product of a primary or secondary amine and an aldehyde (e.g. a urea-formaldehyde resin), and where the base resin is modified with a coupling agent (e.g. a substituted silane). U.S. Pat. No. 3,017,028 discloses the unmodified urea-formaldehyde resin for use as a depressant in froth flotation of potassium bearing ores.

However, there is still a need for more efficient depressants to be used in the froth flotation of potash ores to recover sylvite.

SUMMARY OF THE INVENTION

It is an object of the present invention to provide a depressant for use in a method for froth flotation of potash ores, wherein said depressant is very efficient in blinding clay surfaces for the adsorption of the collector.

Now it has surprisingly been found that a depressant, which is a polyquaternary polymer obtainable by reacting a dialkylamine, a difunctional compound which is an epihalohydrin, a diepoxide, or a precursor thereof, and optionally a polyfunctional amine, is significantly improving the efficiency of the collector and the recovery of sylvite from the potash ore.

DETAILED DESCRIPTION OF THE INVENTION

A first aspect of the present invention relates to the use of a polyquaternary polymer as a depressant in a method for froth flotation of potash ores, the polyquaternary polymer being obtainable by reacting
i) a dialkylamine having the structure $R_1R_2NH$, where $R_1$ and $R_2$ independently are hydrocarbyl groups having 1-3, preferably 1-2, and most preferably 1, carbon atoms;
ii) a difunctional compound selected from the group consisting of epihalohydrins, diepoxides, precursors of epihalohydrins and epoxides which under alkaline conditions are readily converted into the corresponding epoxy compounds, and mixtures thereof, preferably epihalohydrins and most preferably epichlorohydrin; and
iii) optionally a polyfunctional amine selected from the group consisting of ammonia, primary amines, alkylenediamines having 2-6, preferably 2-3, and most preferably 2, carbon atoms, and polyalkylenepolyamines having the structure $H_2N-[R_3-N(R_4)]_y-R_3-NH_2$ where y is an integer from 1 to 5, preferably from 1 to 4, and most preferably from 1 to 3, $R_3$ is an alkylene radical having 2 to 6, preferably 2-3, and most preferably 2, carbon atoms, and $R_4$ is selected from the group consisting of hydrogen, a hydrocarbyl group having 1-3, preferably 1-2, and most preferably 1, carbon atoms, and an ω-aminoalkyl group having 2 to 6, preferably 2 to 3, and most preferably 2, carbon atoms; $R_4$ is preferably hydrogen.

If iii) is present, the molar ratio of i) to iii) is preferably from 99:1 to 85:15. The molar amount of ii) is substantially equal to the sum of the molar amounts of i) and iii) or higher. Preferably, the molar ratio of ii) to i)+iii) is from 1:1 to 1.5:1, more preferably to 1.3:1.

The polyquaternary polymer is preferably dispersable, more preferably soluble in water at 20° C. to at least a concentration of 30 wt %, more preferably to at least 50 wt %.

The most preferred polyquaternary polymer is obtained by reacting i) dimethylamine, ii) epichlorohydrin and iii) ethylenediamine.

The weight average (Mw) molecular weight of the polyquaternary polymer is preferably from $10^4$ to $10^6$ Da, as measured by the size exclusion chromatography method described herein.

In addition to, or alternatively to the molecular weight, the polyquaternary polymer can be characterized by its viscosity as a 50 wt % aqueous composition, according to the method defined herein. The viscosity of the polyquaternary polymer is preferably in the range of from 100 to 20,000 mPa*s, preferably in the range of from 200 to 2000 mPa*s.

In another aspect, the invention relates to a method for froth flotation of potash ores for the recovery of potassium minerals, in which the polyquaternary polymer described herein is used as a depressant.

Such froth flotation method typically comprises the steps:
a) conditioning a pulped potash ore, wherein the potash ore comprises a potassium mineral and a clay component, in a saturated brine solution, preferably a brine saturated with dissolved potash ore from the actual ore deposit, with an effective amount of a depressant, which is a polyquaternary polymer as defined herein,
b) adding a potassium mineral collector reagent and other flotation aids to the pulp and
c) performing a froth flotation process to recover the potassium mineral By using the polyquaternary polymer defined herein as depressant in the froth flotation of potash ore, it is possible to achieve a better recovery of sylvite and an improved efficiency of the collector, especially in warmer flotation slurries (mixture of ore and brine, saturated water solution of salt).

The effective amount of polyquaternary polymer depressant is an amount sufficient for the depressant to act as intended, i.e. to at least partially hinder the potassium mineral collector to adhere to the clay component. The amount will depend on the amount of clay component present in the pulped potash ore, but will in general be in the range of from 10 to 1000 g/ton dry ore, preferably in the range of from 20 to 500 g/ton dry ore.

Sylvite recovery is typically increased when a process of the invention is compared with a process wherein a formaldehyde-urea resin is used as a depressant. Another advantage is that the depressant is very efficient already in a low dosage.

In yet another aspect, the present invention relates to a pulp comprising crushed and ground potash ore, a potassium mineral collector reagent as defined herein, and a polyquaternary polymer as defined herein as a depressor.

The synthesis of the polyquaternary polymers is well-known and is described for example in U.S. Pat. No. 3,738,945.

The collector for the sylvite in the above-mentioned froth flotation method is a cationic surfactant, suitably, but not limited to, an alkylamine. Typically the collector is a primary amine having the formula $R_5NH_2$, where $R_5$ is a hydrocarbyl group having 12-22, preferably 16-22 carbon atoms. Suitable examples are coco alkylamine, tallow alkylamine, soya alkylamine, rape seed alkylamine, myristylamine, palmitylamine, stearylamine, and oleylamine.

Further additives that may be present in the froth flotation method are extender oils, and frothers/froth regulators, such as pine oil, MIBC (methylisobutyl carbinol) and alcohols such as hexanol and alcohol ethoxylates/propoxylates.

Typically, before carrying out the froth flotation of potash ores using the above-mentioned depressant, the major part of the slime will be separated. Thus, in a further embodiment, the present invention also relates to a method wherein the flotation of potash ores, using the depressant of the invention, is preceded by a step which comprises separation of the major part of the slime. The slime may be separated by mechanical means, such as by use of hydro cyclones, centrifuges and hydro separators. It could also be separated by slime flotation, using for example any of the methods described in RU 2278739, U.S. Pat. No. 3,805,951 or WO 2008/152029.

The present invention is further illustrated by the following examples.

EXAMPLES

General Experimental

Flotation Procedure

The potash ore is crushed to a desirable flotation size and scrubbed in brine that is water that is saturated with dissolved potash ore from the actual ore deposit, i.e. potash-brine. Next step is to remove the finest fraction which contains most of the clay. This can be done by mechanical desliming or by slime flotation. If the slime content is low this desliming step can be excluded. For slime flotation the following procedure is used. The slurry is charged to a flotation machine and diluted to an appropriate concentration. The machine is started and the required amount of a flocculating polymer is added as a 0.1 to 0.5% water solution; 10 g/t polyacrylamide (Accofloc A110) is used in the examples. The collector Ethomeen HT/40 (ex Akzo Nobel) diluted in water is then added, 40 g/ton of ore, and the pulp is conditioned for a while. The air is turned on and the resulting froth containing the slimes (water insolubles) is skimmed off as tailing.

The cell product (non-flotated), also known as bottom product, contains the concentrated potash ore ready to be processed further.

Next step is to separate sylvite (KCl) by another flotation step. The flotation feed is treated with a slime depressant followed by addition of an emulsion consisting of 1% alkylamine neutralised with HCl (alkylammonium chloride), frother (glycol ether, 30% based on the amine concentration) and non-polar reagent (extender oil, 30% based on the amine concentration). The solution temperature is about 60° C. and pH is about 3.

Samples of the froth fraction or sylvite (KCl) product and the cell product are dried and analysed for KCl and water insolubles (W.I.) in both fractions. The material balance, i.e recovery of W.I. and KCl, is calculated for the evaluation of results. The content of W.I. and KCl in the flotation feed (the ore sample that was floated) is calculated as the sum of the found content of both the slime product and the cell product for each test. This differs to some extent when compared with the overall analysis, which can be explained as small variations in the ore sample and variations between the analyses. The results of the tests are presented in the following tables.

In the sylvite concentrate the content and recovery of KCl should be high and the W.I. content and recovery should be low. If this condition is met, it means that the flotation is efficient and selective, and the losses of the valuable mineral KCl are low. The cell product should contain a low grade of KCl.

The new slime depressant polyquaternary polymer is manufactured by copolymerisation of epichlorohydrine, dimethylamine and a minor fraction of ethylenediamine.

A modified Formaldehyde-Urea resin (KS-MF ex Metadynea) and potato starch are used for comparison.

The polyquaternary polymers A-F in the table below are in the form of an aqueous solution with normally 50% solid content. Formaldehyde-Urea resin (FU-polymer) is also an aqueous solution with 50% solids. Potato starch solution is prepared by heating 1% dispersed potato starch in water to about 90° C.-100° C. for solubilisation to occur.

Both the polyquaternary polymers and the FU-polymer can be diluted in water or directly in brine to the appropriate concentration for addition to the potash slurry before the addition of the other flotation reagents.

The polyquaternary polymers A-F used in the examples have different average molecule size. The relative molecular weights are determined by size exclusion chromatography (SEC-MALS) with RI detection. Another way to describe the polymer relative sizes is to measure the viscosity of the products at the same solid content. This method is much easier to use than SEC-MALS and is a well established procedure when characterising polymers of this type.

SEC-MALS Method

| Sample Preparation | The samples were dissolved at 1 mg/ml concentration, slowly stirred for seven days, and thereafter filtered through 1.5 μm Nylon syringe filters. |
|---|---|
| HPLC Pump | Dionex P580 isocratic pump |
| Mobile Phase | 0.8M sodium nitrate and 0.5M acetic acid dissolved in Milli-Q purified water |
| Degasser | Degasys populaire vacuum in-line degasser |
| Columns | 2 x TSK gel GMPW, 7.5 x 300 mm, 17 μm |
| Flow rate | 0.2 ml/min |
| Column Oven | Mistral Spark, operated at 50° C. |
| Autosampler | Spectra physics SP 8880, equipped with a 106.9 μl calibrated loop, operated in full loop mode |
| RI Detector | Optilab DSP, operated at 40° C., 690 nm light wavelength |
| MALS Detector | DAWN EOS, operated at ambient temperature, 690 nm light wavelength |
| MALS and RI Calculation | ASTRA ® 4.90.07 was used for calculation. A dn/dc value of 0.17 ml/g was used for sample calculation and 0.16 ml/g for pullulan standard calculation. A linear calibration curve was fitted for samples and a quadratic for the Pullulan standard. |
| Pullulan standard sample preparation | A Pullulan P50 (nominal Mw of 47300) polysaccharide standard from Shodex was prepared at 3.6 mg/ml concentration in mobile phase and stirred for seven days, filtered through 1.5 μm, nylon syringe filter, and analysed. |

Viscosity Measurements

The viscosity of the polymer, 50 wt % dry weight in water was measured with a Brookfield viscometer LVDV-IIPro with Spindle #1 at 60 rpm at 20° C. All the polyquaternary polymers A-F were prepared in a similar way; the reaction time was prolonged to achieve increasing polymer size or average molecular weight.

| Sample | Mw | Visc (mPas) |
|---|---|---|
| A | 80000 | 289 |
| B | 140000 | 482 |
| C | 260000 | 716 |

-continued

| Sample | Mw | Visc (mPas) |
|---|---|---|
| D | 567000 | — |
| E | 450000 | 882 |
| F | 870000** | 10000* |

*estimated value based on a value of 5000 mPas for a sample containing 30 wt % dry weight of polymer F in water
**extrapolated from viscosity measurements Example 1

In this example sylvite was floated from a potash ore, deslimed according to the flotation method described in the general experimental part above. The deslimed potash ore comprised on average 30.2% by weight (% w/w) of KCl and on average 3.0% w/w of water insoluble (W.I). The particle size was ≤0.63 mm.

The ammonium chloride of Armeen HT (hydrogenated tallow alkyl amine, ex Akzo Nobel) was used as collector together with frother and extender oil as an emulsion. The tests are done at two brine temperatures 20° C. and 30° C. to simulate winter and summer conditions.

The content of KCl and W.I. in the slime product and in the cell product was determined. From these values and the weight recovery, the total content of KCl and W.I. in the ore sample used in the flotation was calculated. See table 1

The depressants UF-resin and polyquternary polymers A, B and C are compared at different dosages 150 to 300 g/t of flotation feed. The dosage of sylvite collector Armeen HT is also varied (50 or 60 g/ton).

The desirable result is to have a high grade and recovery of KCl in the concentrate. The grade and recovery of water insoluble should be as low as possible in the concentrate. The grade and recovery of KCl in tailing should consequently be as low as possible. It is also desirable to use efficient flotation chemicals, and therefore low dosages of all flotation chemicals are desirable.

One trend in table 1 is that the new polyquaternary polymers A, B and C show very good results compared to UF-resin, this is the trend in all tests at all dosages.

It is also obvious that all the polyquaternary polymers, especially B and C, show improved results at the elevated temperature 30° C. This temperature and higher is the normal condition during the summer period. It is well known that an elevated temperature creates negative effects on the sylvite flotation process. Therefore the improved performance of the polyquaternary polymers is of great interest.

TABLE 1

| Depressor type | Amine Consumption, g\ton of ore | Concentrate Weight recovery, % | Concentrate Grade, % KCl | Concentrate Grade, % W.I | Concentrate Recovery, % KCl | Concentrate Recovery, % W.I | Tails Content, % KCl | Tails Content, % W.I | Sylvite flotation Feed KCl | Sylvite flotation Feed W.I |
|---|---|---|---|---|---|---|---|---|---|---|
| \multicolumn{11}{c}{Temperature brine = 20° C.} |
| — | — | 50 | 15.24 | 91.69 | 2.36 | 45.47 | 11.68 | 19.77 | 3.21 | 30.73 | 3.08 |
| UF | 150 | 50 | 28.90 | 92.22 | 1.30 | 88.46 | 12.62 | 4.89 | 3.66 | 30.13 | 2.98 |
| A | | | 29.32 | 91.56 | 1.08 | 89.07 | 10.42 | 4.66 | 3.85 | 30.14 | 3.04 |
| B | | | 30.01 | 90.85 | 0.96 | 90.44 | 9.61 | 4.12 | 3.87 | 30.15 | 3.00 |
| C | | | 30.16 | 91.00 | 1.10 | 91.08 | 10.86 | 3.85 | 3.90 | 30.13 | 3.06 |
| UF | | 60 | 30.21 | 92.12 | 1.15 | 92.38 | 11.35 | 3.29 | 3.89 | 30.13 | 3.06 |
| A | | | 30.34 | 92.45 | 0.95 | 93.07 | 9.57 | 3.00 | 3.91 | 30.14 | 3.01 |
| B | | | 30.50 | 92.36 | 1.00 | 93.50 | 10.55 | 2.82 | 3.72 | 30.13 | 2.89 |
| C | | | 30.80 | 91.86 | 1.05 | 93.98 | 10.70 | 2.62 | 3.90 | 30.11 | 3.02 |
| UF | 200 | 50 | 31.37 | 91.75 | 1.28 | 95.38 | 13.28 | 2.03 | 3.82 | 30.18 | 3.02 |
| A | | | 31.55 | 91.53 | 1.08 | 95.86 | 11.27 | 1.82 | 3.92 | 30.12 | 3.02 |

TABLE 1-continued

| Depressor type | Amine Consumption, g\ton of ore | Concentrate Weight recovery, % | Concentrate Grade, % KCl | Concentrate Grade, % W.I | Concentrate Recovery, % KCl | Concentrate Recovery, % W.I | Tails Content, % KCl | Tails Content, % W.I | Sylvite flotation Feed Content, % KCl | Sylvite flotation Feed Content, % W.I |
|---|---|---|---|---|---|---|---|---|---|---|
| B |  | 31.68 | 91.45 | 0.96 | 96.17 | 10.32 | 1.69 | 3.87 | 30.13 | 2.95 |
| C |  | 31.75 | 91.42 | 1.00 | 96.48 | 10.51 | 1.55 | 3.96 | 30.08 | 3.02 |
| UF | 60 | 31.55 | 91.66 | 1.29 | 96.04 | 13.38 | 1.74 | 3.85 | 30.11 | 3.04 |
| A |  | 31.73 | 91.35 | 1.12 | 96.26 | 11.72 | 1.65 | 3.92 | 30.11 | 3.03 |
| B |  | 31.91 | 91.26 | 1.02 | 96.61 | 10.89 | 1.50 | 3.91 | 30.14 | 2.99 |
| C |  | 32.09 | 91.32 | 1.05 | 97.14 | 11.13 | 1.27 | 3.96 | 30.17 | 3.03 |
| Temperature brine = 30° C. | | | | | | | | | | |
| — | — 60 | 11.61 | 89.90 | 2.82 | 34.05 | 11.95 | 22.87 | 2.73 | 30.65 | 2.74 |
| UF | 150 50 | 28.05 | 91.85 | 1.31 | 85.49 | 12.25 | 6.08 | 3.66 | 30.14 | 3.00 |
| A |  | 28.32 | 91.65 | 1.05 | 86.11 | 9.84 | 5.84 | 3.80 | 30.14 | 3.02 |
| B |  | 28.78 | 91.35 | 1.02 | 87.24 | 9.63 | 5.40 | 3.87 | 30.14 | 3.05 |
| C |  | 29.05 | 91.26 | 1.06 | 87.99 | 10.13 | 5.10 | 3.85 | 30.13 | 3.04 |
| UF |  60 | 28.42 | 92.69 | 1.21 | 87.43 | 11.89 | 5.29 | 3.56 | 30.13 | 2.89 |
| A |  | 28.76 | 92.45 | 0.98 | 88.19 | 9.30 | 5.00 | 3.86 | 30.15 | 3.03 |
| B |  | 29.28 | 92.12 | 1.05 | 89.55 | 10.08 | 4.45 | 3.88 | 30.12 | 3.05 |
| C |  | 29.61 | 91.65 | 1.08 | 90.01 | 10.22 | 4.28 | 3.99 | 30.15 | 3.13 |
| — | — 60 | 15.24 | 91.69 | 2.36 | 45.47 | 11.68 | 19.77 | 3.21 | 30.73 | 3.08 |
| UF | 200 50 | 29.82 | 91.75 | 1.25 | 90.80 | 12.44 | 3.95 | 3.74 | 30.13 | 3.00 |
| A |  | 30.09 | 91.68 | 1.12 | 91.53 | 11.26 | 3.65 | 3.80 | 30.14 | 2.99 |
| B |  | 30.52 | 91.56 | 1.09 | 92.72 | 11.01 | 3.16 | 3.87 | 30.14 | 3.02 |
| C |  | 30.96 | 91.36 | 1.04 | 93.80 | 10.71 | 2.71 | 3.89 | 30.16 | 3.01 |
| UF |  60 | 30.05 | 92.19 | 1.15 | 91.90 | 11.56 | 3.49 | 3.78 | 30.14 | 2.99 |
| A |  | 30.34 | 92.02 | 1.02 | 92.61 | 10.25 | 3.20 | 3.89 | 30.15 | 3.02 |
| B |  | 30.88 | 91.64 | 1.00 | 93.81 | 10.23 | 2.70 | 3.92 | 30.16 | 3.02 |
| C |  | 31.00 | 91.56 | 1.03 | 94.18 | 10.56 | 2.54 | 3.92 | 30.14 | 3.02 |
| UF | 300 50 | 30.86 | 93.12 | 1.17 | 95.34 | 12.03 | 2.03 | 3.82 | 30.14 | 3.00 |
| A |  | 31.15 | 92.63 | 1.12 | 95.73 | 11.55 | 1.87 | 3.88 | 30.14 | 3.02 |
| B |  | 31.32 | 92.65 | 0.98 | 96.29 | 10.30 | 1.63 | 3.89 | 30.14 | 2.98 |
| C |  | 31.30 | 93.00 | 1.00 | 96.60 | 10.41 | 1.49 | 3.92 | 30.13 | 3.01 |
| UF |  60 | 30.98 | 93.51 | 0.98 | 96.11 | 10.21 | 1.70 | 3.87 | 30.14 | 2.97 |
| A |  | 31.12 | 93.48 | 0.87 | 96.50 | 8.99 | 1.53 | 3.98 | 30.14 | 3.01 |
| B |  | 31.55 | 92.64 | 0.90 | 96.94 | 9.42 | 1.35 | 3.99 | 30.15 | 3.02 |
| C |  | 31.83 | 92.29 | 0.92 | 97.18 | 9.70 | 1.25 | 4.00 | 30.23 | 3.02 |

Example 2

In this example sylvite was flotated from a potash ore comprising on average 30.5% by weight (% w/w) of KCl and on average 1.2-1.3% w/w of water insolubles (W.I). Particle size was ≤1.5 mm.

The ammonium chloride of Lilaflot 20458 (mixture of alkyl amines, ex Akzo Nobel) was used as collector, together with frother and extender oil as an emulsion. The tests were done at a brine temperature of 20° C.

The content of KCl and W.I. in the slime product and in the cell product was determined. From these values and the weight recovery, the total content of KCl and W.I. in the ore sample used in the flotation was calculated. See table 2

The depressants UF-resin and starch are compared with the new depressant polyquaternary polymers A, B, C, D, E, F. The tests were done with different dosages of 50, 60 and 70 g/ton flotation feed. The dosage of sylvite collector Lilaflot 20458 was constant in all tests (30 g/ton flotation feed).

The desirable result is to obtain a high grade and recovery of KCl in the concentrate. The grade and recovery of water insoluble should be as low as possible in the concentrate. The grade and recovery of KCl in tailing should consequently be as low as possible.

One trend in table 2 is that all the new polyquaternary polymers A, B, C, D, E and F show very good results compared to UF-resin and starch.

It is obvious that starch gives the poorest result for the KCl recovery.

The new polyquaternary polymers all show good results compared to the UF-resin. In this test there is a visible difference between the tested polyquternary polymers. The polymers C, D and E gives very good results, especially version E, which shows very good results at all dosage levels (>94% recovery of KCl).

TABLE 2

| Consumption of the Depressor, g\ton of ore | Products | Weight Recovery, % | Content, % KCl | Content, % W.I.* | Recovery, % KCl | Recovery, % W.I.* |
|---|---|---|---|---|---|---|
| Starch | | | | | | |
| 50 | Ore | 100.00 | 30.52 | 1.22 | 100.00 | 100.00 |
|  | Concentrate | 26.61 | 88.06 | 1.18 | 76.77 | 25.65 |
|  | Tails | 73.39 | 9.66 | 1.24 | 23.23 | 74.35 |
| 60 | Ore | 100.00 | 30.48 | 1.15 | 100.00 | 100.00 |
|  | Concentrate | 27.81 | 88.06 | 1.18 | 80.35 | 28.51 |
|  | Tails | 72.19 | 8.30 | 1.14 | 19.65 | 71.49 |
| 70 | Ore | 100.00 | 30.23 | 1.23 | 100.00 | 100.00 |
|  | Concentrate | 28.16 | 89.27 | 1.08 | 83.15 | 24.71 |
|  | Tails | 71.84 | 7.09 | 1.29 | 16.85 | 75.29 |
| UF | | | | | | |
| 50 | Ore | 100.00 | 30.52 | 1.22 | 100.00 | 100.00 |
|  | Concentrate | 28.46 | 88.06 | 0.88 | 82.11 | 20.47 |
|  | Tails | 71.54 | 7.63 | 1.36 | 17.89 | 79.53 |
| 60 | Ore | 100.00 | 30.47 | 1.22 | 100.00 | 100.00 |
|  | Concentrate | 29.80 | 88.06 | 0.78 | 86.12 | 19.02 |
|  | Tails | 70.20 | 6.02 | 1.41 | 13.88 | 80.98 |

TABLE 2-continued

| Consumption of the Depressor, g\ton of ore | Products | Weight Recovery, % | Content, % KCl | Content, % W.I.* | Recovery, % KCl | Recovery, % W.I.* |
|---|---|---|---|---|---|---|
| 70 | Ore | 100.00 | 30.23 | 1.21 | 100.00 | 100.00 |
|  | Concentrate | 30.66 | 89.27 | 0.70 | 90.54 | 17.79 |
|  | Tails | 69.34 | 4.12 | 1.43 | 9.46 | 82.21 |
| A: M.W.** = 80,000 | | | | | | |
| 50 | Ore | 100.00 | 30.23 | 1.20 | 100.00 | 100.00 |
|  | Concentrate | 30.32 | 88.82 | 0.69 | 89.09 | 17.45 |
|  | Tails | 69.68 | 4.73 | 1.42 | 10.91 | 82.55 |
| 60 | Ore | 100.00 | 30.12 | 1.21 | 100.00 | 100.00 |
|  | Concentrate | 30.54 | 89.97 | 0.72 | 91.23 | 18.23 |
|  | Tails | 69.46 | 3.80 | 1.42 | 8.77 | 81.77 |
| 70 | Ore | 100.00 | 30.23 | 1.22 | 100.00 | 100.00 |
|  | Concentrate | 30.97 | 89.21 | 0.78 | 91.38 | 19.77 |
|  | Tails | 69.03 | 3.77 | 1.42 | 8.62 | 80.23 |
| B: M.W.** = 140,000 | | | | | | |
| 50 | Ore | 100.00 | 30.12 | 1.23 | 100.00 | 100.00 |
|  | Concentrate | 30.84 | 88.17 | 0.66 | 90.28 | 16.49 |
|  | Tails | 69.16 | 4.23 | 1.49 | 9.72 | 83.51 |
| 60 | Ore | 100.00 | 30.22 | 1.24 | 100.00 | 100.00 |
|  | Concentrate | 30.83 | 89.89 | 0.48 | 91.69 | 11.92 |
|  | Tails | 69.17 | 3.63 | 1.58 | 8.31 | 88.08 |
| 70 | Ore | 100.00 | 30.22 | 1.24 | 100.00 | 100.00 |
|  | Concentrate | 31.01 | 89.95 | 0.48 | 92.31 | 12.02 |
|  | Tails | 68.99 | 3.37 | 1.58 | 7.69 | 87.98 |
| C: M.W.** = 260,000 | | | | | | |
| 50 | Ore | 100.00 | 30.13 | 1.23 | 100.00 | 100.00 |
|  | Concentrate | 30.56 | 89.39 | 1.03 | 90.68 | 25.57 |
|  | Tails | 69.44 | 4.04 | 1.32 | 9.32 | 74.43 |
| 60 | Ore | 100.00 | 30.15 | 1.27 | 100.00 | 100.00 |
|  | Concentrate | 31.37 | 89.75 | 0.81 | 93.39 | 20.01 |
|  | Tails | 68.63 | 2.90 | 1.48 | 6.61 | 79.99 |
| 70 | Ore | 100.00 | 30.15 | 1.27 | 100.00 | 100.00 |
|  | Concentrate | 31.45 | 89.75 | 0.81 | 93.61 | 20.07 |
|  | Tails | 68.55 | 2.81 | 1.48 | 6.39 | 79.93 |
| D: M.W.** = 567,000 | | | | | | |
| 50 | Ore | 100.00 | 30.12 | 1.20 | 100.00 | 100.00 |
|  | Concentrate | 30.87 | 90.72 | 0.92 | 92.99 | 23.74 |
|  | Tails | 69.13 | 3.05 | 1.32 | 7.01 | 76.26 |
| 60 | Ore | 100.00 | 30.22 | 1.23 | 100.00 | 100.00 |
|  | Concentrate | 31.55 | 89.75 | 0.81 | 93.69 | 20.70 |
|  | Tails | 68.45 | 2.79 | 1.43 | 6.31 | 79.30 |
| 70 | Ore | 100.00 | 30.22 | 1.23 | 100.00 | 100.00 |
|  | Concentrate | 31.62 | 89.75 | 0.81 | 93.92 | 20.87 |
|  | Tails | 68.38 | 2.69 | 1.42 | 6.08 | 79.13 |
| E: M.W.** = 450,000 | | | | | | |
| 50 | Ore | 100.00 | 30.32 | 1.24 | 100.00 | 100.00 |
|  | Concentrate | 31.72 | 90.56 | 0.77 | 94.74 | 19.68 |
|  | Tails | 68.28 | 2.34 | 1.46 | 5.26 | 80.32 |
| 60 | Ore | 100.00 | 30.12 | 1.23 | 100.00 | 100.00 |
|  | Concentrate | 31.95 | 89.43 | 0.75 | 94.85 | 19.43 |
|  | Tails | 68.05 | 2.28 | 1.46 | 5.15 | 80.57 |
| 70 | Ore | 100.00 | 30.12 | 1.23 | 100.00 | 100.00 |
|  | Concentrate | 31.98 | 89.43 | 0.75 | 94.96 | 19.46 |
|  | Tails | 68.02 | 2.23 | 1.46 | 5.04 | 80.54 |
| F: M.W.** = 870,000 | | | | | | |
| 50 | Ore | 100.00 | 30.12 | 1.24 | 100.00 | 100.00 |
|  | Concentrate | 28.84 | 89.24 | 1.06 | 85.46 | 24.70 |
|  | Tails | 71.16 | 6.15 | 1.31 | 14.54 | 75.30 |
| 60 | Ore | 100.00 | 30.39 | 1.20 | 100.00 | 100.00 |
|  | Concentrate | 29.43 | 89.95 | 0.96 | 87.11 | 23.55 |
|  | Tails | 70.57 | 5.55 | 1.30 | 12.89 | 76.45 |
| 70 | Ore | 100.00 | 30.39 | 1.20 | 100.00 | 100.00 |
|  | Concentrate | 29.98 | 89.95 | 0.96 | 88.73 | 24.02 |
|  | Tails | 70.02 | 4.89 | 1.30 | 11.27 | 75.98 |

Note
*W.I.—water insoluble residue;
**M.W.—molecular weight

The invention claimed is:

1. A method for improving potash ore froth flotation comprising adding to the froth flotation an effective amount of a polyquaternary polymer as a clay depressant, wherein the polyquaternary polymer is obtainable by reacting
   i) a dialkylamine having the structure $R_1R_2NH$, where $R_1$ and $R_2$ independently are hydrocarbyl groups having 1-3 carbon atoms; and
   ii) a difunctional compound selected from the group consisting of epihalohydrins, diepoxides, precursors of epihalohydrins and epoxides which under alkaline conditions are readily converted into the corresponding epoxy compounds, and mixtures thereof.

2. The method of claim 1 wherein the dialkylamine is dimethylamine.

3. The method of claim 1 wherein the difunctional compound is an epihalohydrin.

4. The method of claim 1 further comprising a polyfunctional amine selected from the group consisting of ammonia, primary amines, alkylenediamines having 2-6 carbon atoms, and polyalkylenepolyamines having the structure $H_2N-[R3-N(R4)]y-R3-NH_2$, where y is an integer from 1 to 5, R3 is an alkylene radical having 2 to 6 carbon atoms, and R4 is selected from the group consisting of hydrogen, a hydrocarbyl group having 1-3 carbon atoms, and an ω-aminoalkyl group having 2 to 6 carbon atoms, and mixtures thereof.

5. The method of claim 4 wherein the molar ratio of dialkylamine to polyfunctional amine is from 99:1 to 85:15.

6. The method of claim 4 wherein the molar amount of the difunctional compound is substantially equal to the sum of the molar amounts of dialkylamine and polyfunctional amine or higher.

7. The method of claim 1, wherein the polyquaternary polymer is dispersable in water.

8. The method of claim 1 wherein the potash ore flotation is performed with a potassium mineral collector reagent which is a cationic surfactant.

9. The method of claim 8 wherein the potassium mineral collector reagent is an alkylamine.

10. The method of claim 8 wherein the potassium mineral collector reagent is a primary amine having the formula $R_5NH_2$, where $R_5$ is a hydrocarbyl group having 12-22 carbon atoms.

11. The method of claim 10 wherein $R_5$ is a hydrocarbyl group having 16-22 carbon atoms.

12. The method of claim 1 wherein the flotation of potash ores is preceded by a step which comprises separation of slime.

13. The method of claim 12 wherein the slime is separated by mechanical means.

14. A method for froth flotation of potash ores for the recovery of potassium minerals comprising the steps of
   a) conditioning a pulped potash ore, wherein the potash ore comprises a potassium mineral and a clay component, in a saturated brine solution with an effective amount of a polyquaternary polymer,
   b) adding a potassium mineral collector reagent, and
   c) performing a froth flotation process to recover the potassium mineral,
   wherein the polyquaternary polymer is obtainable by reacting i) a dialkylamine having the structure $R_1R_2NH$, where $R_1$ and $R_2$ independently are hydrocarbyl groups having 1-3 carbon atoms, and ii) a difunctional compound selected from the group consisting of epihalohydrins, diepoxides, precursors of epihalohydrins and epoxides which under alkaline conditions are readily converted into the corresponding epoxy compounds, and mixtures thereof.

15. A pulp comprising a crushed and ground potash ore, a potassium mineral collector reagent which is a cationic surfactant, and a polyquaternary polymer obtainable by reacting i) a dialkylamine having the structure $R_1R_2NH$ where $R_1$ and $R_2$ independently are hydrocarbyl groups having 1-3 carbon atoms, and ii) a difunctional compound selected from the group consisting of epihalohydrins, diepoxides, precursors of epihalohydrins and epoxides which under alkaline conditions are readily converted into the corresponding epoxy compounds, and mixtures thereof.

16. The method of claim 3 wherein the difunctional compound is epichlorohydrin.

17. The method of claim 4 wherein the polyfunctional amine is ethylenediamine.

18. The method of claim 1 wherein the polyquaternary polymer is soluble in water.

19. The method of claim 12 wherein the slime is separated by flotation.

\* \* \* \* \*